United States Patent
Schunder et al.

(10) Patent No.: US 8,352,186 B2
(45) Date of Patent: Jan. 8, 2013

(54) VEHICLE NAVIGATION SYSTEM AND METHOD

(75) Inventors: Mark Schunder, Dearborn, MI (US); Mark Scalf, Santa Clara, CA (US); Joseph J. Berry, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 12/847,650

(22) Filed: Jul. 30, 2010

(65) Prior Publication Data

US 2012/0029805 A1    Feb. 2, 2012

(51) Int. Cl.
*G08G 1/123* (2006.01)
*G01C 21/34* (2006.01)
*G01C 21/00* (2006.01)

(52) U.S. Cl. ........ 701/533; 701/420; 701/437; 701/466; 701/467; 701/534

(58) Field of Classification Search .......... 701/408–430, 701/437, 445, 446, 451, 452, 454, 460, 461, 701/468, 469, 472, 484, 494, 501, 517–522, 701/527, 533, 534, 467

See application file for complete search history.

(56) References Cited

U.S. PATENT DOCUMENTS

| | | | | |
|---|---|---|---|---|
| 5,398,189 A | * | 3/1995 | Inoue et al. | 701/437 |
| 5,488,559 A | * | 1/1996 | Seymour | 701/446 |
| 5,508,931 A | * | 4/1996 | Snider | 701/446 |
| 5,515,283 A | * | 5/1996 | Desai et al. | 701/461 |
| 5,550,538 A | * | 8/1996 | Fujii et al. | 340/995.21 |
| 5,638,280 A | * | 6/1997 | Nishimura et al. | 701/418 |
| 5,646,855 A | * | 7/1997 | Jones et al. | 701/467 |
| 5,899,954 A | * | 5/1999 | Sato | 701/446 |
| 6,211,798 B1 | * | 4/2001 | Albrecht et al. | 340/990 |
| 6,236,935 B1 | * | 5/2001 | Helmstadter et al. | 701/466 |
| 6,285,923 B1 | * | 9/2001 | Matsuda et al. | 701/1 |
| 6,510,385 B2 | * | 1/2003 | Hijikata | 701/411 |
| 6,909,398 B2 | * | 6/2005 | Knockeart et al. | 342/357.31 |
| 7,353,108 B2 | * | 4/2008 | Adachi | 701/410 |

(Continued)

FOREIGN PATENT DOCUMENTS

JP        06-341844    * 12/1994

(Continued)

OTHER PUBLICATIONS

Machine Translation of JP 2006-038807 attached.*

(Continued)

*Primary Examiner* — Khoi Tran
*Assistant Examiner* — Abby Lin
(74) *Attorney, Agent, or Firm* — Jennifer M. Stec; Brooks Kushman P.C.

(57) ABSTRACT

An efficient route-defining method includes determining a route to a destination. The exemplary method also includes determining a wireless device to server connection type and assigning a tolerance in accordance with a connection type. The tolerance is usable to determine if a vehicle is off-route, and the tolerance is increased or decreased inversely corresponding to the speed of the connection type. According to the illustrative method, the assigned tolerance is used to determine points defining the route, such that the roads comprising the route are within a bounded area. The bounded area may be defined by the tolerance in conjunction with a plurality of lines connecting successive points along the route. Finally, the method includes delivering the determined points to a vehicle computing system in communication with the server.

6 Claims, 7 Drawing Sheets

U.S. PATENT DOCUMENTS

| | | | |
|---|---|---|---|
| 7,660,667 B2 * | 2/2010 | Furukawa | 701/420 |
| 7,734,415 B2 * | 6/2010 | Oumi et al. | 701/417 |
| 7,797,103 B2 * | 9/2010 | Ishigami et al. | 701/417 |
| 2002/0198632 A1 * | 12/2002 | Breed et al. | 701/1 |
| 2003/0033083 A1 * | 2/2003 | Nakashima et al. | 701/211 |
| 2004/0104842 A1 * | 6/2004 | Drury et al. | 342/357.13 |
| 2004/0254723 A1 * | 12/2004 | Tu | 701/209 |
| 2005/0102102 A1 * | 5/2005 | Linn | 701/210 |
| 2006/0184321 A1 * | 8/2006 | Kawakami et al. | 701/209 |
| 2006/0265125 A1 * | 11/2006 | Glaza | 701/210 |
| 2006/0287812 A1 * | 12/2006 | Takashima | 701/200 |
| 2007/0055444 A1 * | 3/2007 | Mikame | 701/211 |
| 2007/0112504 A1 * | 5/2007 | Krause et al. | 701/200 |
| 2008/0288163 A1 * | 11/2008 | Asano | 701/118 |
| 2011/0153200 A1 * | 6/2011 | Tsuji et al. | 701/201 |
| 2011/0301830 A1 * | 12/2011 | Tate, Jr. | 701/200 |

FOREIGN PATENT DOCUMENTS

| | | | |
|---|---|---|---|
| JP | 2006038807 A | * | 2/2006 |
| JP | 2006-38807 | * | 9/2006 |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Kermit Whitfield, "A hitchhiker's guide to the telematics ecosystem", Automotive Design & Production, Oct. 2003, http://findarticles.com, pp. 1-3.

* cited by examiner

VEHICLE NAVIGATION SYSTEM AND METHOD

BACKGROUND

Vehicle navigations systems, such as on-board systems and portable GPS systems, have been available for years now. Originally, theses systems would often receive map information from removable media, such as a CD or DVD. More recently, many of the map systems have an internal memory storing map information.

Although some systems store maps on local memory, such as a hard disk drive (HDD) or flash memory, other systems may contact a remote network to receive mapping information. This information, for example, may be a series of directions delivered over a wireless connection. In instances such as this, where map data is not stored (or only partially stored) on a local HDD, a provider may be constrained by, for example, bandwidth limitations, in how quickly the data can be delivered.

In at least one existing system, the Ford SYNC system, a vehicle computing system (which may contain or is in communication with a vehicle navigation system, either on or off-board) may connect to a remote network using the voice channel. This connection is a limited bandwidth connection employing the voice-band of a wireless device connected to the vehicle computing system and a remote network.

Because the voice-band has a limited available bandwidth, information is capped at a low delivery speed (relative to, for example, a pure data connection). While this normally may not affect a need-for-data scenario, because the user can wait, in some instances this can be somewhat problematic, as in the case of a user in a moving vehicle requesting directions. If the requested directions cannot be delivered in an efficient manner over the available bandwidth, then the user may actually pass a first or even a second turn on a route before the directions are delivered to the vehicle (due, for example, to a large file being delivered over a low bandwidth connection).

SUMMARY

In a first illustrative embodiment, a method includes determining a route to a destination. The exemplary method also includes determining a wireless device to server connection type and assigning a tolerance in accordance with the connection type. The tolerance is usable to determine if a vehicle is off-route, and the tolerance is increased or decreased inversely corresponding to the speed of the connection type. In other words, for a fast connection, the tolerance is low (meaning a more precise route, likely having more route points and a greater data size, but also having an increased likelihood of swift off-route condition detection.

According to the illustrative method, the assigned tolerance is used to determine points defining the route, such that the roads comprising the route are within a bounded area. The bounded area may be defined by the tolerance in conjunction with a plurality of lines connecting successive points along the route.

Finally, the method includes delivering the determined points to a vehicle computing system in communication with the server.

In a second illustrative embodiment, method includes determining a route to a destination and determining a road classification for each road or a portion of each road comprising the route. In one non-limiting example, road classifications are based on speed ranges.

The exemplary method also includes assigning a tolerance to each road or portion of each road based on the determined classification for that road or road portion.

The method further includes determining points defining the route, using the assigned tolerances, such that the roads comprising the route are within a bounded area defined by the tolerance in conjunction with a plurality of lines connecting successive points along the route.

Finally, the method includes delivering the determined points to a vehicle computing system in communication with the server.

In yet a third illustrative embodiment, a server-implemented method includes determining a route to a destination and dividing the route into a plurality of portions. The method also includes determining a number of exits for each portion and assigning a tolerance to each portion based on the determined number of exits.

The illustrative method also includes determining points defining the route, using the assigned tolerances, such that the roads comprising the route are within a bounded area defined by the tolerance in conjunction with a plurality of lines connecting successive points along the route.

Finally, the method includes delivering the determined points to a vehicle computing system in communication with the server.

DETAILED DESCRIPTION

Figure 1:
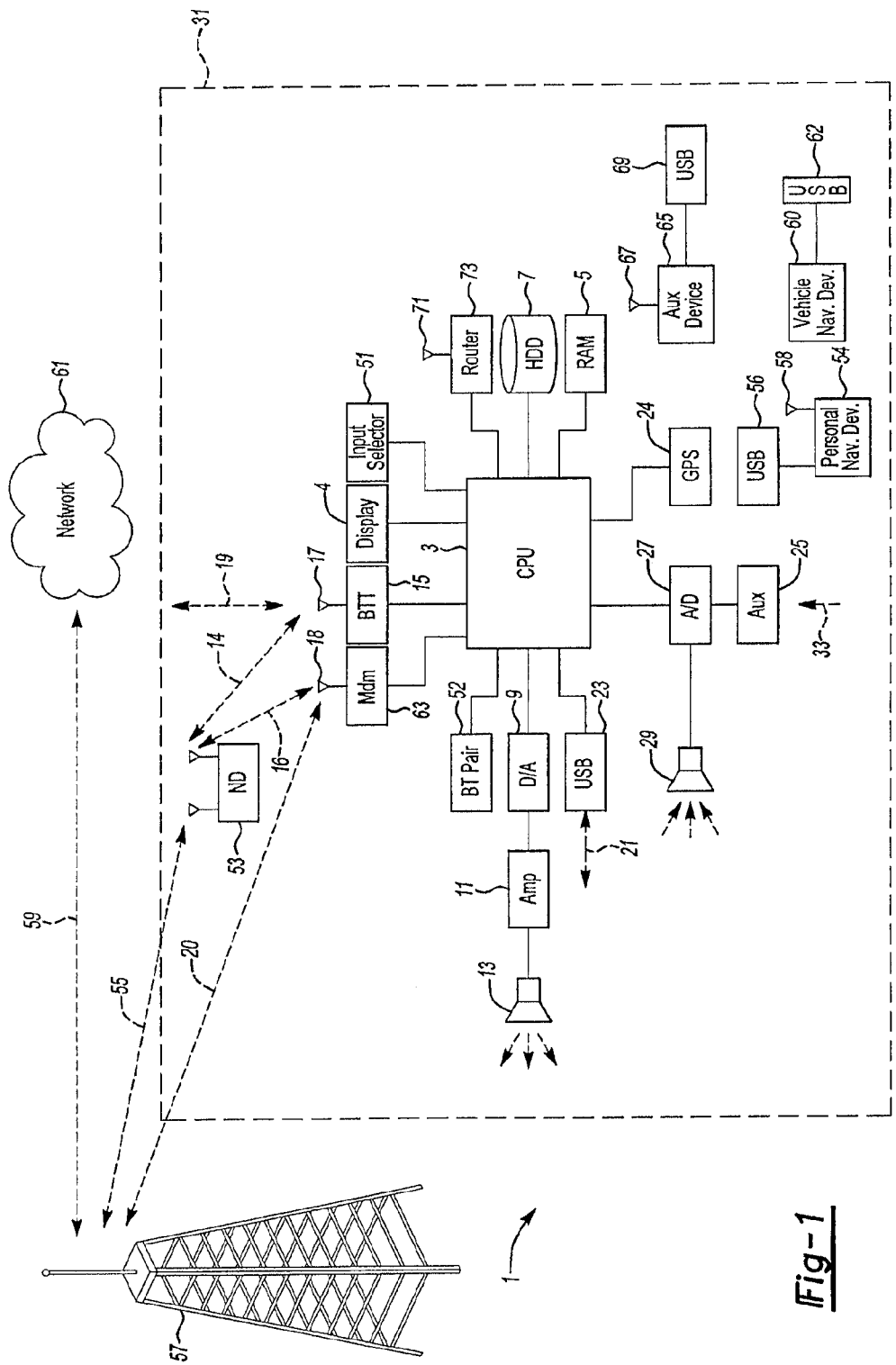
FIG. 1 illustrates an example block topology for a vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
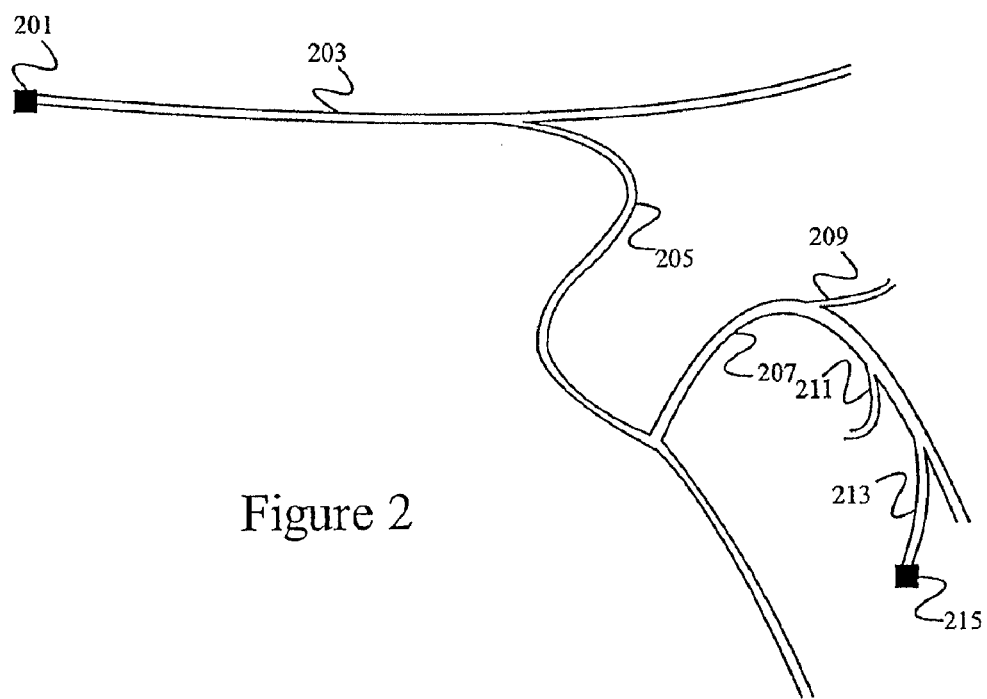
FIG. 2 shows an illustrative example of a route to be traveled.

FIG. 2 shows an illustrative example of a route to be traveled. In this illustrative embodiment, a user is first located at a present location 201. The user may currently be in motion or be stationary, but this is the point from which the directions to a destination 215 are requested.

In this embodiment, a first road 203, along which a user is traveling, is relatively straight. Even though the road curves north as it travels east, the road is generally straight and has no off-roads before the user turns onto road 205.

Road 205 has several switchbacks, but is also free of intersections before the user enters road 207. Road 207 is taken to road 213 which leads to the destination. Road 207 has a rather significant curve in it, as well as several off-roads 209 and 211 which the user must bypass in order to reach destination 215.

Figure 3:
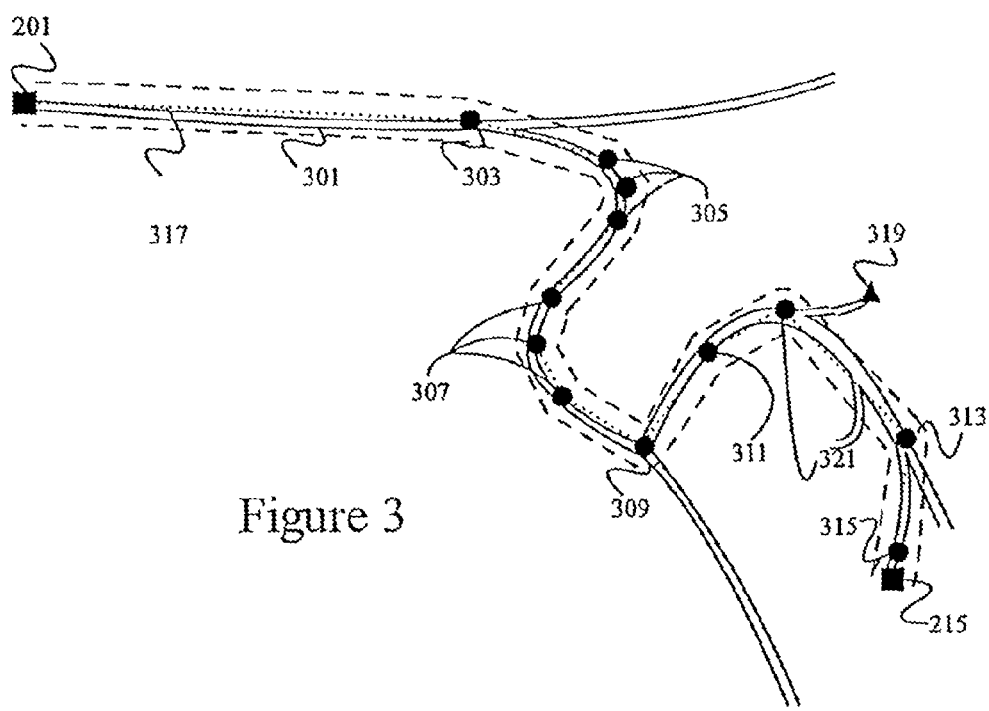
FIG. 3 shows an illustrative example of a navigation calculation with a low off-route threshold overlaid on the route shown in FIG. 2.

FIG. 3 shows an illustrative example of a navigation calculation with a low off-route threshold overlaid on the route shown in FIG. 2. In this illustrative embodiment, a navigation system has a low off-route threshold 301. The off-route threshold is a tolerance that determines if a user is still traveling on an assigned route. For example, without limitation, if the tolerance is set at twenty feet (20 ft), then as long as a GPS position of a user is detected within twenty feet of the GPS coordinates corresponding to a given road, the navigation system will recognize that the user is still traveling on the proper route.

If the off-route tolerance is set too high for a given area, a user could be well off route and the system would not recognize the off-route condition. For example, without limitation, if a the tolerance were set at two hundred feet, in a neighborhood where streets were one hundred feet apart, then the user could be off-route by as much as two streets and the navigation system would still think the user was on route.

In the illustrative embodiment shown in FIG. 3, the tolerance 301 is shown bordering the route to be traveled (the actual roads have been removed for clarity of illustration). The route 317 is the route "known" by the navigation system. In this embodiment, as long as the actual road remains within the tolerance around the route 317, additional "route points"

(e.g., 303) are only necessary as long as fewer route points would provide a route that exists outside the tolerance. In other words, because the tolerance contains the entire actual route, then as long as the user remains on the actual route, the system will not register an off-route condition. If the user accidentally turned and ended up at position 319, then an off-route condition would be recognized.

As can be seen in FIG. 3, for at least the first portion of travel to off-route point 319, the road is still within the tolerance, so it may take a few seconds for the system to recognize the off-route condition. If the tolerance were made smaller, then more of the road leading to off-route point 319 would fall outside the tolerance and the system would recognize the off-route condition sooner. The tradeoff in this, however, is that more road points may be needed to define the route, as areas such as the curve between points 309 and 311 and the curve between points 321 and 313. With the tolerance at its present level, however, the entire route remains within the tolerance, and thus, as long as the driver remains on the route, the system will not register an off-route condition.

In this illustrative embodiment, fifteen points are used to represent a route. Each point can be at least a two part number pair, each number having six decimal places. Thus, using a low tolerance, a long route or a route with many turns may require a significant number of data points to define.

In this embodiment, the route 317 is represented by a series of straight lines connecting the route points. These straight lines are not the actual lines along which a user will travel, but serve to define the tolerance within which the actual route may be contained.

In this illustrative embodiment, a route point is included at least at each turn. On the route between points 201, 303 and the first of points 305, it may be possible to define the route using only points 201 and the first of points 305. This, however, would not include the turn at point 303, and the user would be left to guess which direction to take when the road forked. At each data point, however, the system can provide an instruction if needed, and thus the system can include the instruction to turn at point 303.

In some instances, a series of points may be needed to define a portion of a route, even though no instruction may be provided at those points. For example, without limitation, points 305 and 307 define the turns at those points, although no actual instruction to the user is needed (since the user has no option but to follow the road. The need for the plurality of points defining the turn could be removed by increasing the tolerance, although this could cause other problems, as previously noted (such as a failure to recognize an off-route condition quickly enough). Similarly, points 311, 315 would not be needed if the tolerance were increased.

Points 309, 313 and 321 are included because there are road breaks and/or turn instructions required at those points.

Figure 4:
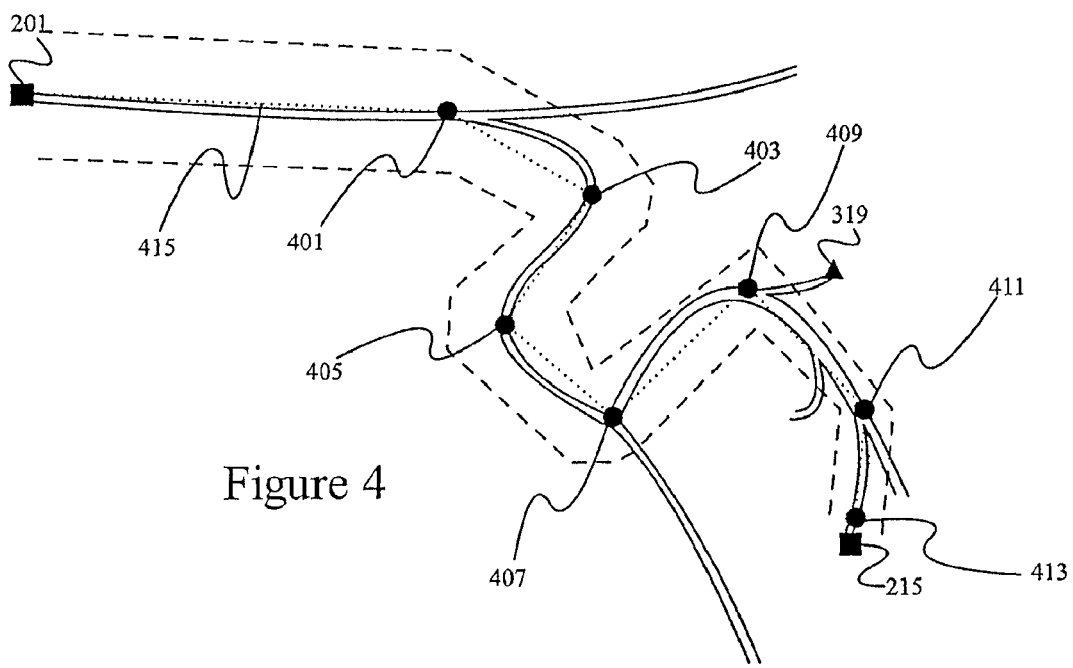
FIG. 4 shows an illustrative example of a navigation calculation with a dynamically adjustable off-route threshold, overlaid on the route shown in FIG. 2.

FIG. 4 shows an illustrative example of a navigation calculation with a dynamically adjustable off-route threshold, overlaid on the route shown in FIG. 2. In this illustrative embodiment, a larger threshold may be used for portions of the route 415 where there is little or no chance of the user going off-route. For example, between points 201 and 407, there is only one turn-off where a user could go off route (after point 401), accordingly, in this embodiment, the off-route threshold is set at a large value (for example, 100 feet). Since the user would have to physically drive off the road and onto a non-road in order to leave the route at almost any point, a fewer number of points can be used to define the route. Points provided at actual turns 401, 407 are still used, as well as two points 403, 405 to define the curved portion of the road. If a large enough threshold were employed, even points 403 and 405 would not be needed.

In this illustrative embodiment, as more options become available for off-route conditions, the threshold is dynamically lowered. For example between points 407 and 413, the threshold is lowered close to the original threshold shown in FIG. 3. In this embodiment, this is due to the fact that several exits are possible where the user could go off route, and accordingly it is desirable to determine an off-route condition more quickly (e.g., use a smaller threshold). For example, if the larger threshold were used, then the system may not even detect an off-route condition at point 319.

Even with this reduced threshold over this portion of the highway, the system is able to draw out the route using only turn points 409 and 411.

It is desirable to strike a balance between a maximum threshold (to reduce required route points, thus reducing the data size of the entire route) and a minimum time to detect an off-route condition. This can be achieved, for example, without limitation, by dynamically adjusting the threshold based on a number of options for off-route conditions or by dynamically adjusting the threshold based on a road classification type.

In one system of classification, roads are given a rating based on the speed limit of the road. The classification can generally define classes of road (e.g., without limitation, a class III road may have a speed of 40-50 mph). Although not a perfect guide, roads with speeds of over 60 mph are generally highways (and thus usually have fewer off-route options than, for example, a surface street). Accordingly, in one embodiment, the system will use a larger threshold when the driver is traveling on a highway class road and a smaller threshold when the driver is on a surface road.

The surface roads may even be further delineated between classes, such that classes that commonly have less space between them or more exits are mapped with smaller thresholds than are roads that common are more spaced apart or have less exit opportunities.

In yet a further embodiment, one or two general thresholds may be used. For example, a threshold of one hundred feet may be used for highway travel and a threshold of twenty feet may be used for surface road travel.

Particular methods of adjusting thresholds can be used based on the need for balancing speed of calculation vs. size of download vs. delay in off-route calculation. For example, using the simple two-threshold method would produce faster results and keep a relatively small sized total route in many cases, since the large threshold on highways will often produce a route with few data points connecting long distances. This system, however, could be more susceptible to slower diagnosis of off-route conditions, and there is greater chance for a user to travel further off-route before being notified of the error than under another system.

Using a greater number of threshold delineations, with at least one below twenty feet (as an example) could reduce the likelihood of delay in diagnosing an off-route condition, but could increase the number of total route points needed to define a route. This would increase the overall download size. The processing time may also be increased, as calculating more points may take a longer time.

In a third example, the threshold size may be dynamically determined based on the number of off-route options for an upcoming stretch of a route. In this embodiment, the processing time would likely be increased because the system would have to "check" a portion of a route for off-route options (e.g., without limitation, count the number of turn-offs). The number of data points would likely be more than the fixed two threshold system as well, and the resulting data package would likely be larger. The off-route notification, however, would likely be closer to an optimal situation, since the threshold is lowered when a higher number of off-route possibilities are present.

Figure 5:
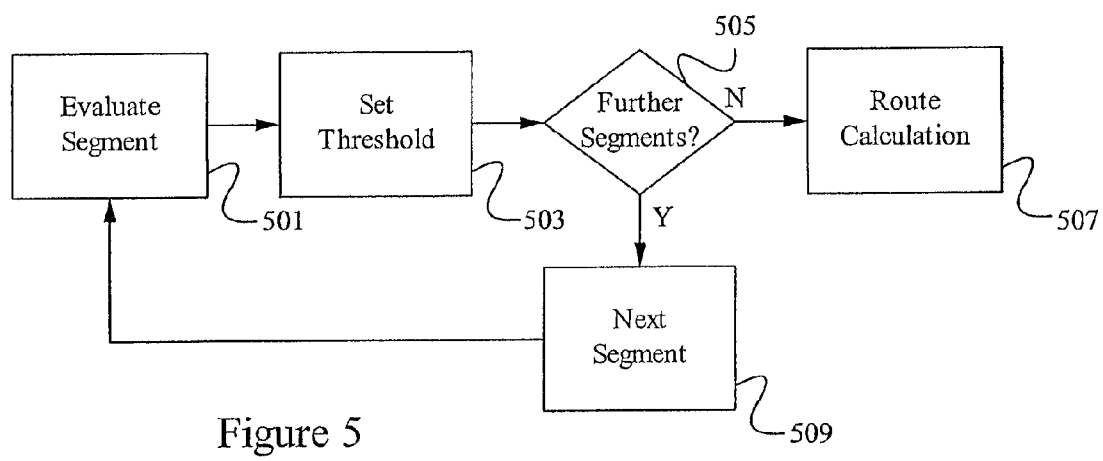
FIG. 5 shows an illustrative example of a process for adjusting a threshold based on a road classification.

FIG. 5 shows an illustrative example of a process for adjusting a threshold based on a road classification. In this embodiment, a route determination process examines a segment of a route to be traveled 501. Although the route could be divided in numerous manners, in this embodiment, a segment is defined by each individual road. In other words, when a route calls for a driver to leave one road for another, a new segment is obtained. A threshold corresponding to the segment classification is set 503, and then the process checks to see if any further segments exist 505. If no new segments exist, the process proceeds to route calculation 507. If segments remain, the process moves to a next segment 509 and repeats the threshold setting.

Figure 6:
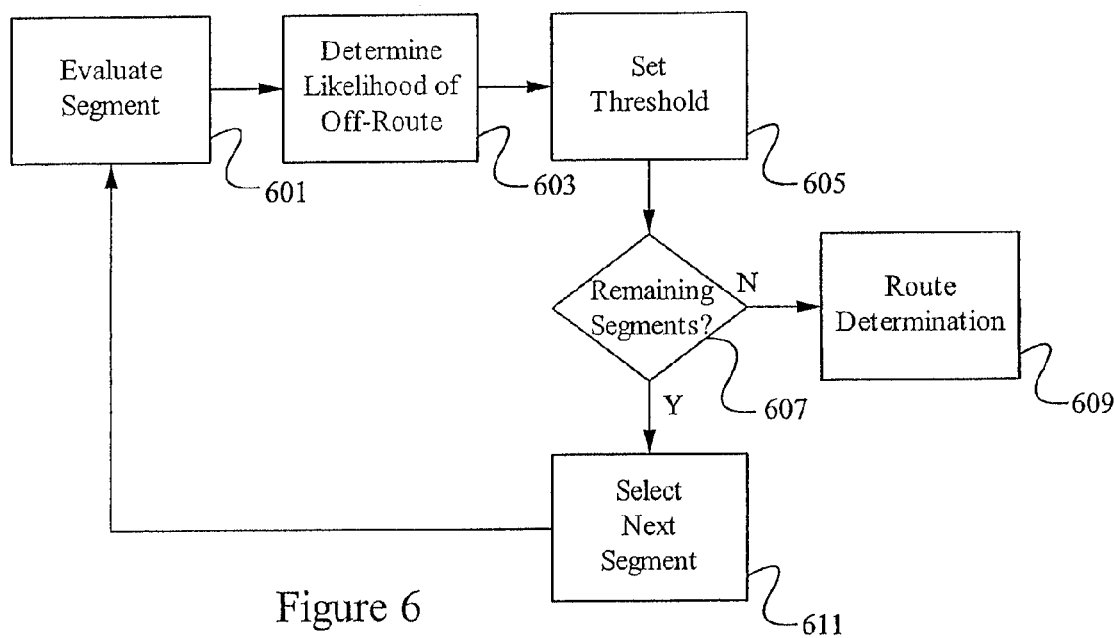
FIG. 6 shows an illustrative example of a process for dynamically adjusting an off-route threshold based on a likelihood of an off-route occurrence.
Figure 7:
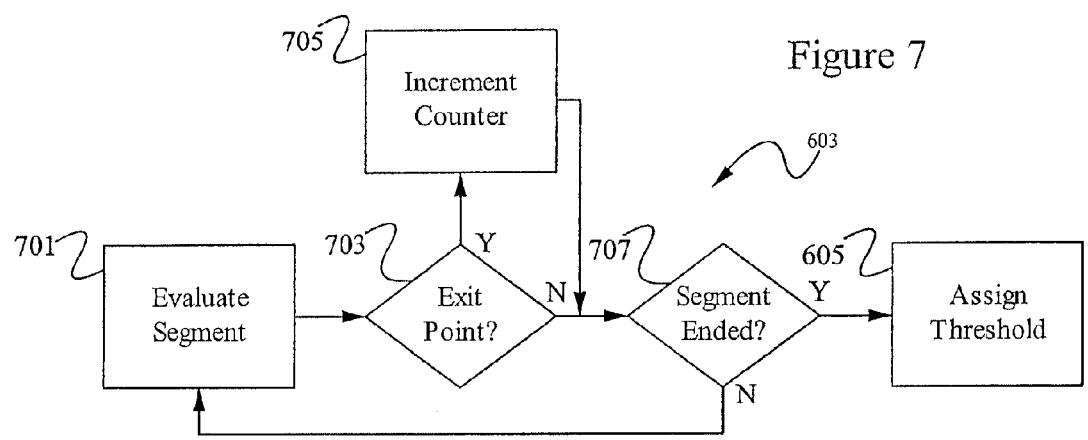
FIG. 7 shows an illustrative example of a process for determining a likelihood of an off-route occurrence.

Any evaluation process, including, but not limited to, that shown in FIGS. 5, 6, and 7, may also be performed for a portion of a long route. The process may be subsequently then repeated as a next portion of the route is approached.

For example, in a route running from Detroit to Los Angeles, a route determination process may first be performed for a stretch of road running from Detroit to Chicago (or a smaller or larger portion of the route). Since the driver will not need information past Chicago for at least a few hours (the amount of time it takes to drive from Detroit to Chicago), a very large threshold can be used to approximate the route from Chicago to Los Angeles. Alternatively, the entire route can be examined and downloaded at the onset using a detailed threshold level.

As the driver approaches Chicago (or at any point after the initial directions have been delivered to get the driver on the way), the system can then evaluate a second portion of the route. In this manner, a route can be quickly evaluated, and more precise directions can be obtained as they are required. This is yet another example of providing a bandwidth efficient route, which may have a high degree of accuracy with regards to off-route reporting yet is still deliverable in a rapid manner over a low bandwidth connection.

If the system is only verbally providing directions, as opposed to displaying the entire route (or some future portion of the route), then directions can be calculated at some predetermined time before they are needed, such that a higher degree of accuracy can be used with respect to the threshold whilst maintaining a concise and rapid delivery.

FIG. 6 shows an illustrative example of a process for dynamically adjusting an off-route threshold based on a likelihood of an off-route occurrence. In this illustrative embodiment, the system again evaluates a segment of a route 601. It is possible to divide the route into segments based on when a turn is made, as with the example provided with respect to FIG. 5. In this embodiment, however, the road is divided into segments of predetermined length. If a segment is shorter than the predetermined length, it is simply treated as its own segment.

Although not necessary, by dividing the segment into predetermined lengths, a better trade-off between efficiency and off-route detection may be obtained. For example, if a twenty mile stretch of road had five exits within the first five miles, and no exits for the next fifteen miles, treating the entire road as one segment might result in a low threshold (due to the number of exits at the onset). Dividing the road into four five-mile segments (as one non-limiting example) could result in a first evaluation using a low threshold, but subsequent evaluations using a much greater threshold and thus potentially requiring fewer data points. Of course, it is also contemplated that the road will be divided based on turns (such that the entire exemplary twenty mile segment would be evaluated as a single segment).

After selecting a segment for evaluation 601, the system determines a likelihood an off-route occurrence 603. This could be based on, for example, a number of exits, a road class, etc. One example of such a determination is shown with respect to FIG. 7.

Based on the likelihood of the off-route occurrence, a threshold is set for that segment of the route 605. The system then determines whether or not any segments of the route remain 607. If no segments remain, the system proceeds to route determination 609. Otherwise, the system selects a next segment 611 and continues with threshold setting.

FIG. 7 shows an illustrative example of a process for determining a likelihood of an off-route occurrence 603. In this illustrative embodiment, the determination is based on a number of opportunities for an off-route occurrence.

In this embodiment, a segment is evaluated 701 until an exit point is reached 703 or a segment ends 707. If an exit point is reached, a counter is incremented 705. If the segment has not yet ended 707, the process continues.

If the segment has ended, the process can proceed to assigning a threshold 605.

The navigational route and threshold processing described above may be performed at CPU 3 at vehicle 31 (FIG. 1). Alternatively, processing may be performed at one or more computer servers in communication with network 61. As explained above, data may be communicated between CPU 3 at vehicle 3 and the server(s) via wireless communication links 14/55 (using nomadic device (ND) 53) or link 20 (using modem 63).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method comprising:
using a first computing system, dividing a route into a plurality of portions, each having a number of exits;
assigning a distance tolerance to each portion based at least in part on the number of exits, wherein a finite number of tolerances may be assigned, and wherein a highest tolerance corresponds to a fewest number of exits, a lower tolerance corresponds to a highest number of exits, and any remaining tolerances correspond to numbers of exists such that as numbers of exits increase, the tolerances decrease;
determining points defining the route such that the roads comprising the route fall within a bounded area defined by the tolerance in conjunction with a plurality of lines connecting successive points along the route; and
delivering the determined points to a vehicle computing system for navigating the vehicle toward a destination.

2. The method of claim 1, wherein each road of the route is one portion.

3. The method of claim 1, wherein each number of exits corresponding to a tolerance comprises a range of numbers of exits.

4. The method of claim 1, wherein the bounded area is an area having the lines as a central axis and the tolerance defines a distance to either side of the lines, between successive points, to an outer border of the bounded area.

5. The method of claim 1, wherein the bounded area is an area having the line as a central axis and the tolerance defines a distance, axially centered about the lines, such that half the tolerance equals the distance from the line to an outer border of the bounded area.

6. The method of claim 1, wherein the higher the number of exits on a portion, the lower the tolerance assigned to the portion.

* * * * *